Figure 1:
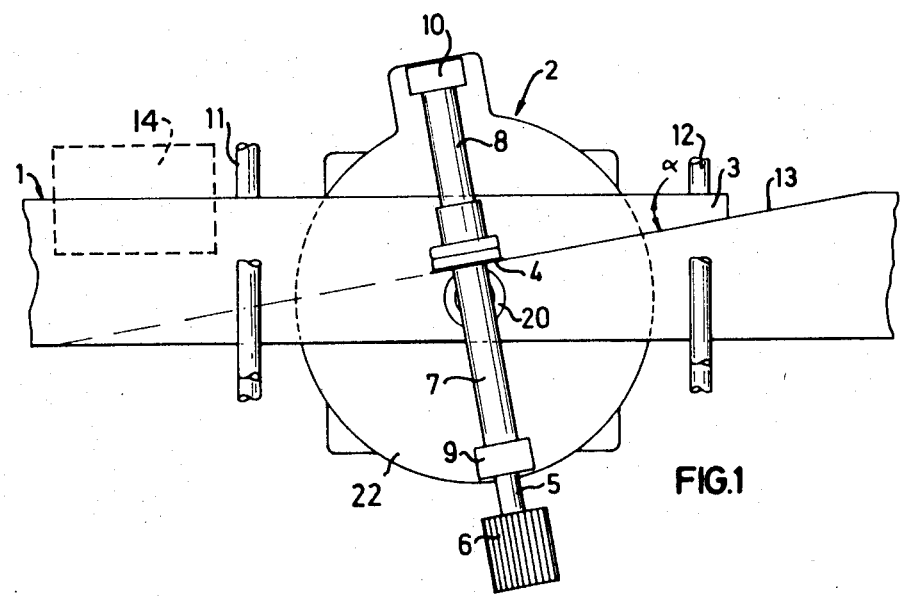

United States Patent [19]

Wennerström

[11] 4,283,976
[45] Aug. 18, 1981

[54] APPARATUS FOR PRECUTTING METAL STRIP IN THE MANUFACTURE OF SPIRAL STRIP PIPES, E.G. VENTILATION DUCTS

[75] Inventor: Karl F. Wennerström, Stockholm, Sweden

[73] Assignee: Prov & Verktyg AB, Sweden

[21] Appl. No.: 3,719

[22] Filed: Jan. 15, 1979

[30] Foreign Application Priority Data

Jan. 17, 1978 [SE] Sweden ................. 7800535

[51] Int. Cl.³ .................. B26D 1/56; B23D 25/02
[52] U.S. Cl. ........................ 83/301; 83/341; 83/406; 83/353; 83/496; 83/428; 113/116 UT; 83/917
[58] Field of Search ............... 72/49, 50, 203; 83/496, 83/497, 428, 353, 559, 406, 917, 301, 341; 113/116 UT

[56] References Cited

U.S. PATENT DOCUMENTS

| | | | |
|---|---|---|---|
| 668,945 | 2/1901 | Allen | 83/497 |
| 740,730 | 10/1903 | Zeh | 83/428 |
| 1,831,374 | 11/1931 | Topping | 83/917 |
| 2,969,930 | 1/1961 | Zernov | 83/428 |
| 3,203,291 | 8/1965 | Elsas | 83/406 |
| 3,319,500 | 5/1967 | Wild et al. | 83/353 |
| 3,364,710 | 1/1968 | Rouyer et al. | 83/496 |
| 3,485,128 | 12/1969 | Siegenthaler | 83/428 |
| 3,606,779 | 9/1971 | Parma | 72/49 |
| 3,620,114 | 11/1971 | Chudyk | 83/406 |
| 3,640,162 | 2/1972 | Fleming, Jr. et al. | 83/433 |
| 3,731,512 | 5/1973 | Vogel et al. | 72/203 |
| 3,765,292 | 10/1973 | Fujiwara | 83/353 |

FOREIGN PATENT DOCUMENTS

| | | | |
|---|---|---|---|
| 2001880 | 7/1971 | Fed. Rep. of Germany | 72/49 |
| 17658 | 10/1962 | Japan | 72/49 |

Primary Examiner—Daniel C. Crane
Attorney, Agent, or Firm—Ostrolenk, Faber, Gerb & Soffen

[57] ABSTRACT

A cutting means in an apparatus for continuously manufacturing spiral strip piping, fed in unbroken lengths, consisting of an upper, driven knife wheel (4) and a lower, freely rotating, circular, substantially horizontal support roller knife (20). The knives (4,20) are arranged on a table (22), swivellable in relation to the travel of the strip (1) and displaceable perpendicularly to the travel of the strip (1). Before cutting, the angle of the upper knife (4) to the travel of the strip (1) is adjusted, by means of the swivellable table (22), to the desired pipe diameter for providing square pipe ends.

7 Claims, 3 Drawing Figures

APPARATUS FOR PRECUTTING METAL STRIP IN THE MANUFACTURE OF SPIRAL STRIP PIPES, E.G. VENTILATION DUCTS

Modern pipe manufacture is to a large extent done using long sheet strip. The strip is seamed, e.g. with a single fold on one edge and a double fold on the other edge. The strip then goes into a pipe-forming part of the machine where the folded edges are pressed together and possibly reinforced further, e.g. by soldering or welding. A long, continuous pipe without transverse joints is thus formed, and this pipe can afterwards be cut to desired lengths.

Using this method, pipes having different diameters can be produced from different materials such as stainless steel or galvanized steel sheet, and with different material thicknesses.

The majority of pipe made from thin galvanized steel sheet in this way has mainly been used for ventilation ducting.

Investigations have been carried out with regard to the noise problems occurring in cutting such pipes. As an example can be mentioned that in cutting ventilation ducts with a diameter of 400 mm by means of a fine-toothed circular saw, there is a noise lying in the region of about 110-120 dB A, when the rapidly rotating saw cuts into the slowly rotating duct. The sound has a duration of about one minute and is repeated about twenty times per hour, depending on what lengths are produced.

The industry has made great efforts to put this noise problem right, especially since authorities have prescribed a boundary value of 85 dB A for such noise. The best reduction of the noise which has been managed so far is 10 dB A, and this has been done by cladding walls and roof with absorbent material. This is an extremely expensive method of noise reduction, and the results are also poor, as will be noted.

A further disadvantage with the cutting procedure used up to now in the art is that the throughput of the machine must be heavily reduced while cutting takes place, which means that machine capacity is utilized very poorly.

The object of the present invention is thus to provide an apparatus for producing spiral strip pipes in desired lengths continuously, with full capacity, and without noise problems occurring.

The invention thus relates to an apparatus for uninterrupted manufacture of spiral strip piping, the strip being fed into the apparatus in a continuous length, said apparatus consisting of a feed means, a cutting means with knives and a punch for making cutting location marks in the strip to guide the knives for cutting the pipe to tubes of desired lengths, rolls for shaping the edges of the strip, and means for forming the strip into pipe and closing the seams, characterized in that the cutting means consists of an upper, driven knife wheel and a lower, freely rotating, circular, substantially horizontal support roller knife, arranged on a table swivellable in relation to the travel of the strip, and arranged for translation across the strip, perpendicular to its direction of travel, the angle of the upper knife to the travel of the strip being adjustable, before cutting, with the help of the swivellable table, for taking the pipe diameter into account in providing square pipe ends.

For certain sheet material, and especially in the manufacture of stainless steel tubes, the pipe is made without folded edges and the strip edges are welded instead. In such cases it can be more suitable to use a nibbler instead of the knife and support roller knife described above. The angle setting and translation of the cutting means during cutting is done in the same way as for the knife wheel.

The strip is thus cut or nibbled with the apparatus according to the invention before entry into the pipe-forming machine. The cut is made so that no further operational steps are required to provide finished pipe ends. The strip is cut at an angle adjusted to the diameter of the finished pipe. For example, if a strip 140 mm wide is used for producing pipes with a diameter of 400 mm, the strip must be cut at an angle of 7°, giving a cut which is 1256 mm long.

Figure 3:
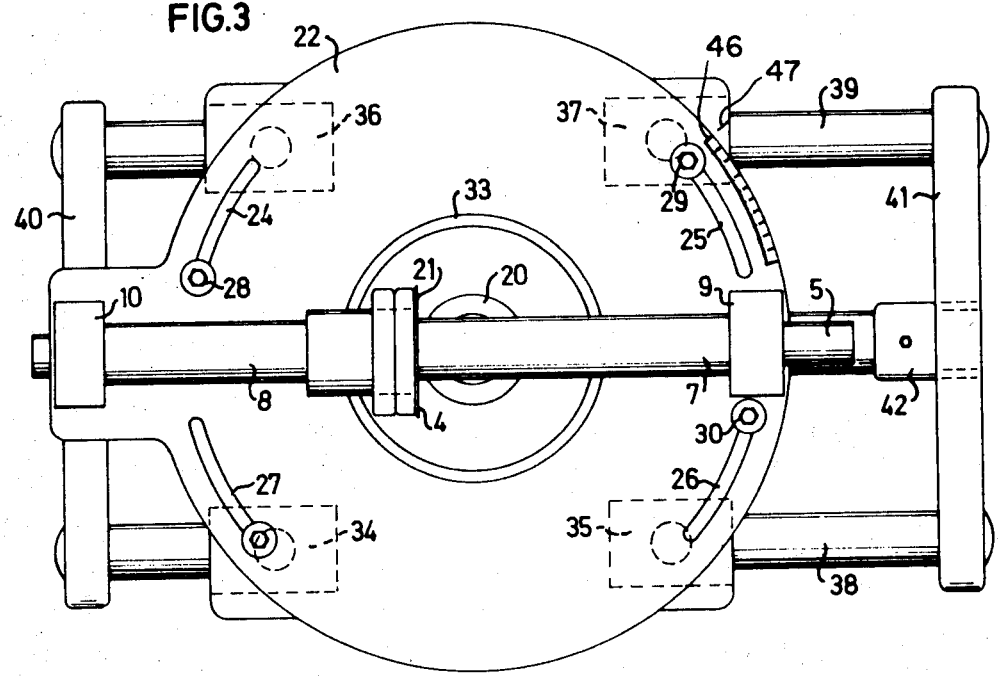
Figure 2:
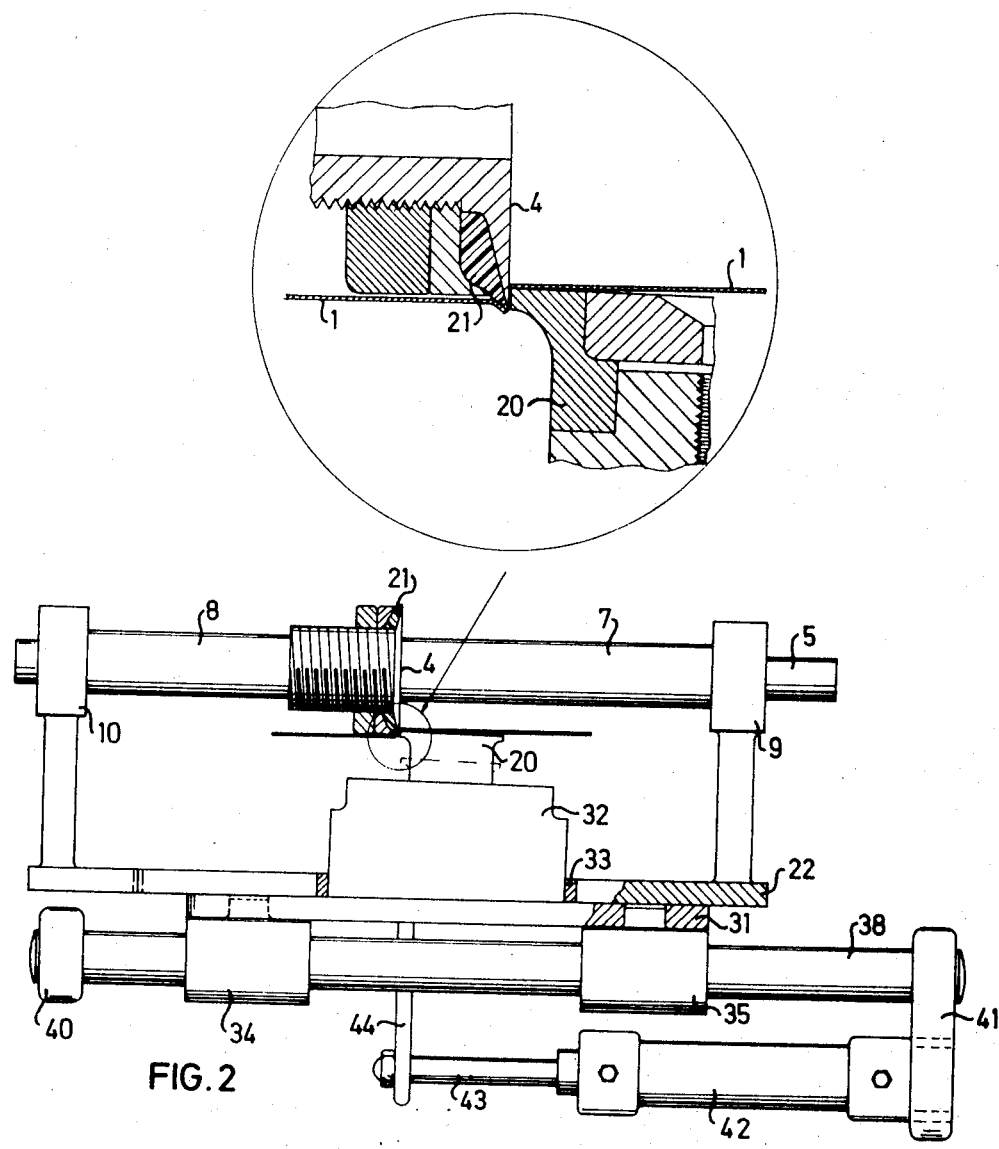

The inventive apparatus will now be described in detail in conjunction with an embodiment example and while referring to the accompanying drawings, on which FIG. 1 is a schematic view,
FIG. 2 is a side view, and
FIG. 3 is a view from above of the precutting apparatus.

Sheet strip 1 is fed into the precutting apparatus 2, with which a cut 3 is made at an angle α, depending on the diameter of the finished tube. The cut 3 is made by the vertical knife wheel 4, mounted on a shaft 5 and driven by a variable speed motor 6. Two conventional spacer sleeves 7 and 8 are used to locate the knife wheel 4 on the shaft 5. The shaft 5 is conventionally carried in taper roller bearings in housings on two pillars 9,10. Before and after the precutting apparatus 2 there are possibly arranged guide means 11 and 12 for the strip, e.g. pairs of rolls. So that the knife will begin the cut in exactly the right place, some form of marking 13 must be made in the strip, e.g. by means of a punch 14 placed somewhere before the precutting apparatus. This mark is suitably made as a triangle where the short side is at right angles to the strip edge and is as deep as the fold which is then made. The slope of the long side of the triangular mark 13 shall be the same as the angle in which the strip is cut.

By masking the clip 13 as wide as the width of the fold, a projecting strip tip is avoided at the end of the pipe. Such a tip is always obtained at one end of the pipe when cutting spirally-wound, folded-edge pipes, when the fold is cut obliquely, and this tip can easily cause personal injury in handling and has therefore been cut off manually up to now.

When working with stiff strip, either one or both of the guide means can be dispensed with, since the seam fold wheels engage the strip directly after the precutting apparatus.

As is apparent from FIG. 2, the strip 1 is cut by the knife wheel 4 in coaction with a raisable and lowerable roller knife 20 with its surface at an inclination of about 1° to the horizontal plane. The knife wheel 4 is also provided with a ring 21 of wear-resistant polymer material, e.g. Adiprene (registered trademark), for pressing down the strip against the knife 20 while cutting. During the course of the cutting operation, the knife wheel works edge to edge against the support roller knife. As the knife wheel shears the plate, the support roller knife rotates with the plate, thus enabling the oblique cut.

The support roller knife, as mentioned, is inclined about 1° to the horizontal plane, with its shearing edge highest. The strip engages the roller knife on this side only and is otherwise not in contact with it. The shearing edge of the knife 20 is formed with a clearance angle of about 2°, resulting in that it slopes about 1° from the cutting edge of the vertical knife wheel 4. The cutting edge of the support roller knife 20 is further so formed that the cut strip can be pressed down under the shearing edge thereof by the ring 21.

The pillars 9 and 10, forming together with the shaft 5 a support structure for the knife wheel 4, are mounted on a swivellable table 22. Four arcuate slots 23-26 are made in the table, by means of which the table can be set in different positions using bolts 27-30 in the baseplate 31, see FIG. 3. The support roller knife is mounted on a pneumatic or hydraulic cylinder 32, with which it can be raised or lowered, and this cylinder is in turn secured to the baseplate 31. A self-lubricating sliding bearing 33 is arranged between the cylinder and the table 22 so that the table can be swivelled.

The baseplate 31 is mounted on four rolling ball guide bearings 34-37 in pairs on two ground shafts 38 and 39. The baseplate with the whole cutting apparatus can be transversely translated to these two shafts. The shafts are attached to end plates 40 and 41, in turn mounted in a structure carrying the cutting apparatus. A means for moving the cutting apparatus transversely is mounted on one of the end walls, e.g. end wall 41.

This reciprocating feed and return motion can be accomplished in different ways. For example, it can be arranged with the help of a hydraulic cylinder, which can then provide both cutting and return motion, or if the cut is controlled by the movement of the strip, a means for quick return of the cutting apparatus, e.g. some kind of spring or pneumatic cylinder. Transverse feed can also be carried out using a screw.

The apparatus is shown in FIG. 2 as having a hydraulic cylinder 42, the piston 43 of which is connected to the baseplate 31 by a bracket 44, e.g. a length of steel flat.

According to a preferred embodiment, the transverse movement of the knife wheel 4 is controlled by the travel of the strip and its own rotation, while the return motion can be provided by a spring 45 or some other suitable means.

Before the strip is taken into the cutting apparatus, it is suitably provided with markings or recesses at the beginning of the cut, e.g. by means of a punch 14 mounted on a column. When the mark reaches the knife wheel 4, the latter starts simultaneously as the support roller knife 20 is raised to the cutting position. The support roller knife shearing edge can be made from a metal carbide for wear resistance.

The knife wheel and roller knife are fed transversely during the cut while the strip travels in a fixed path. This can be done by the strip gliding against the somewhat oblique support roller knife 20, which then rotates to accompany the movement of the strip. Cutting is facilitated by the ring 21 made from polymer, e.g. Adiprene (registered trademark), which presses the strip down below the edge of the support roller knife which, as previously mentioned, is arranged with a certain inclination to the horizontal.

In order that the finished pipes will have square ends, the angle of the cut must be suited to the diameter of the finished pipe. The greater the diameter, the less the angle of cut. The angular setting is made with the help of the swivellable table 22. The bolts are loosened, the table turned with the bolts sliding in the arcuate slots, and the bolts once again tightened.

It is also expendient to provide the swivellable table with an angular scale 46 graduated directly in "pipe diameters" with a pointer 47, so that the cutting apparatus can be set directly for the tube diameter to be produced.

The support roller knife 20 is lowered after each cut, so that both knife wheel and support roller knife are disengaged from the strip and can return to the starting position. This return movement can be achieved in many different ways, partly depending on how the knife feed is done during the cutting sequence. If the feed is done by a screw, hydraulic cylinder or the like, return motion is suitably provided with the same means. In the case where the travel of the sheet guides the feed of the vertical knife wheel 4, the return can be made with the help of a spring, for example.

The rear end of one tube and the front end of the next tube are formed at the same time when the strip is cut. The tubes are formed continuously and come out from the machine one by one, but in immediate proximity to each other. The result of this is that the machine can be run at full capacity the whole time. Compared with previous production methods, this entails a considerable improvement.

As is apparent from FIG. 2, the edge forming the forward tube edge when the tube comes of of the pipe-forming machine will be deformed some millimeters inwardly which is very advantageous when the tubes are jointed by being pushed one inside the other.

Noise level has not only been lowered by the inventive apparatus, but the source of noise has in actual fact been entirely removed. The noise reduction of 10 dB A accomplished up to now by insulating the machine hall is several times more expensive than the cost of the apparatus, which is practically soundless with regard to cutting per se.

I claim:

1. Apparatus for uninterruptedly manufacturing spiral strip to be used for fabricating spiral strip piping, said apparatus being positioned along a feed path for operating on continuous strip material having a longitudinal axis and opposite edges extending parallel with said axis, the apparatus comprising in combination:

strip cutting means comprising an upper driven knife wheel and means for driving the upper driven knife wheel to rotate about a rotative axis thereof; and a lower freely rotating, circular, substantially horizontal support roller with a substantially vertical rotation axis for cooperating with the upper driven knife wheel for cutting the strip fed to the cutting means;

feed means for feeding a strip into the cutting means in a continuous length thereof; the feed means feeding the strip in a feed direction past the strip cutting means;

punch means positioned upstream from the strip cutting means, with respect to the feed direction;

table means supported for swiveling in rotative orientation with respect to the direction of feeding of the strip; the cutting means being supported on the table means for swiveling therewith; means for adjusting the swivel orientation of the table means. prior to the feeding of the strip and the cutting thereof, for adjusting the location of the upper driven knife wheel around the support roller knife, which adjusts the angle of the cut across the strip for a selected pipe diameter;

means for translating the table means across the feed direction of the strip for enabling the strip to be cut at an angle to the feed direction thereof so that said cutting means cuts the strip along a straight line extending from a first point on one edge of said strip to a second point on the opposite edge of said strip longitudinally spaced from said first point;

the punch also being placed at the side of the apparatus from which the table means commences its translation by the translating means; the punch thus being positioned at the edge of the strip to be cut before the strip is fed to the strip cutting means; the punch being shaped for making triangular stampings in the edge of the strip at the starting points for each cut, with the stamping having a side extending perpendicular to the longitudinal axis of said strip, wherein the stampings act as cutting location marks for the upper knife eliminating the free, projecting, triangular plate tip which would otherwise be formed at the beginning of the cut strip;

said cutting means being positioned so that each cut is made coextensive and parallel with another side of the triangular stamping in said strip.

2. Apparatus as claimed in claim 1, wherein the support roller knife is inclined at an angle to the horizontal plane of about 1° to allow rotation accompanying the travel of the strip, and with its highest point being at the cutting location at which the upper knife and the support roller knife meet for cutting the strip.

3. Apparatus as claimed in claim 1, characterized in that transverse translation is provided by a screw.

4. Apparatus as claimed in claim 1, characterized in that transverse translation is provided by the travel of the strip.

5. Apparatus as claimed in claim 1, wherein the swivellable table is supported on a support and the table means includes a plurality of arcuate, elongate slots for clamping the table at the desired swivel angle with respect to the support by means of a corresponding plurality of bolts.

6. Apparatus as claimed in claim 1, characterized in that the swivellable table is provided with an angle scale and a pointer for setting the cutting means in accordance with the intended tube diameter.

7. Apparatus as claimed in claim 1, wherein the translating means comprises a hydraulic cylinder connected with the table means.

* * * * *